United States Patent [19]

Ching et al.

[11] 4,050,482
[45] Sept. 27, 1977

[54] BATTERY PLATE PASTING METHOD AND APPARATUS

[75] Inventors: Larry K. W. Ching, Littleton; Charles E. Coleman, Lakewood; Toshio Uba, Denver, all of Colo.

[73] Assignee: The Gates Rubber Company, Denver, Colo.

[21] Appl. No.: 672,104

[22] Filed: Mar. 31, 1976

[51] Int. Cl.$^2$ .......................... H01M 7/00; B05C 11/00
[52] U.S. Cl. ..................................... 141/1.1; 29/623.5; 118/42; 118/405; 141/32
[58] Field of Search ................. 118/42, 404, 405, 410, 118/411, 413, 415; 141/1.1, 32, 33, 83, 100, 131, 163, 168, 177, 280, 283, 324, 325; 29/623.5

[56] References Cited

U.S. PATENT DOCUMENTS

| 2,385,277 | 9/1945 | Hatfield | 141/32 |
| 2,659,341 | 11/1953 | Taggart | 118/42 X |
| 3,566,613 | 3/1971 | Kinney | 141/83 X |
| 3,814,628 | 6/1974 | Larkin | 118/410 X |

Primary Examiner—Richard E. Aegerter
Assistant Examiner—Frederick R. Schmidt
Attorney, Agent, or Firm—Curtis H. Castleman, Jr.; Raymond Fink; H. W. Oberg, Jr.

[57] ABSTRACT

Method and apparatus are disclosed for the pasting of foraminous battery plate substrates with viscous, thixotropic pastes using an extrusion type bifurcated nozzle.

35 Claims, 9 Drawing Figures

1

BATTERY PLATE PASTING METHOD AND APPARATUS

BACKGROUND OF THE INVENTION

This invention relates to the pasting of foraminous grid substrated with viscous electrochemically active paste, and more particularly to the fabrication of thin, flexible, pasted lead-based electrode plates suitable for use in normally sealed, preferably spirally wound lead-acid batteries.

Conventional lead-acid pasters employ an open-air vertical feed gear pump which injects paste into the usual cast lead rigid grid moving horizontally under the gear pump. Doctor blades are normally employed to scrap off excess paste. This type of system has not been found suitable for accurately pasting relatively pure lead grids, which are generally soft and flexible. Pasting systems which have been found suitable for metering and applying viscous, preferably thixotropic lead-based pastes onto soft deformable lead grids are taught in U.S. Pat. Nos. 3,814,628 to Larkin and 3,894,886 to Pankow et al. In these patents a single cavity discharge nozzle is disposed on one side of the grid and applies a ribbon of paste to the grid at a substantially predetermined volumetric flow rate.

SUMMARY OF THE INVENTION

According to one aspect, the method of the invention includes the steps of (1) positioning first and second nozzle halves in juxtaposed relation and spaced apart a distance greater than the thickness of the grid substrate to define a passageway, with the cavities of each nozzle half being in at least partial alignment across the passageway, and one of the cavities being provided with an inlet for reception of paste; (2) advancing the grid substrate through the passageway; (3) supplying paste to the inlet of the one cavity and forcing paste through interstices formed in the advancing grid substrate and into the other cavity, which may be a blind cavity; and (4) withdrawing the thus pasted grid substrate through the passageway. Additional operations such as rolling and cutting may be employed.

In another aspect, the method of the invention includes the provision of an exit port in the cavity of the nozzle opposite the cavity having the inlet, and employing a recirculation loop for continual mixing and agitation of the paste.

In another aspect, the method of the invention includes pasting foraminous battery substrates by the steps including (1) continually pumping and circulating the viscous thixotropic battery paste with a first pump means through a substantially closed loop conduit system, equipped with an inlet for make-up paste (similar to U.S. Pat. No. 3,814,628 above); (2) diverting the flow of a portion of the circulating paste away from the closed loop and metering the diverted paste at a substantially predetermined volumetric flow rate to a pasting nozzle comprised of a pair of spaced apart juxtaposed nozzle cavities, the spacing defining a substrate passageway; (3) advancing the foraminous substrate through the passageway while simultaneously flowing paste through one of the cavities, through interstices in the substrate and into the other nozzle cavity; and (4) preferably recirculating paste from an outlet of the other nozzle cavity back to the closed loop.

In another aspect, apparatus for performing the above mentioned methods is disclosed.

BRIEF DESCRIPTION OF THE DRAWINGS

The invention will be more particularly described with respect to preferred embodiments by reference to the accompanying drawings, wherein like numerals represent like parts, and wherein.

PREFERRED EMBODIMENTS OF THE INVENTION

The method generally applies to the pasting of foraminous or grid substrates having through interstices with a viscous, electrochemically active paste. These pastes are highly viscous, preferably thixotropic, and resemble a slurry or suspension of fine solid particles in a vehicle. Such thixotropic pastes may rheologically resemble "quick clays", wet mortar, cement or the like. The finely divided particles of solids are generally macromolecular in size, rather than colloidal. These thixotropic paste materials are essentially non-plastic and behave like non-Newtonian fluids insomuch as the viscosity of the paste varies with its rate of flow in a closed loop network.

The grid substrate must be foraminous, that is there are voids or holes which extend completely through the thickness of the grid connecting its major surfaces. The grip may be perforated, in the form of an expanded mesh, woven wire screen, and the like. It is preferred that the material used in the grid be a good electrical conductor and preferably be substantially deformable or soft. With lead materials, it is preferred that the material have a purity of at least about 99.9 weight percent, however, lower purity alloys are useful providing the Brinell hardness (10mm/31.2kg-120 sec.) be preferably less than about 10kg/mm$^2$, and more preferably less than about 8kg/mm$^2$. For instance, various lead-calcium alloys, e.g., containing 0.07 weight percent or less calcium, and lead-tin alloys containing preferably less than about 10 weight percent tin are generally sufficiently deformable. On the other hand, typical antimonial lead containing generally from 6-10 weight percent antimony does not fall within the preferred hardness range. In this respect, see *Lead and Lead Alloys*, W. Hofmann, Springer-Verlag, Berlin-Heidelberg, 1970.

Figure 1:
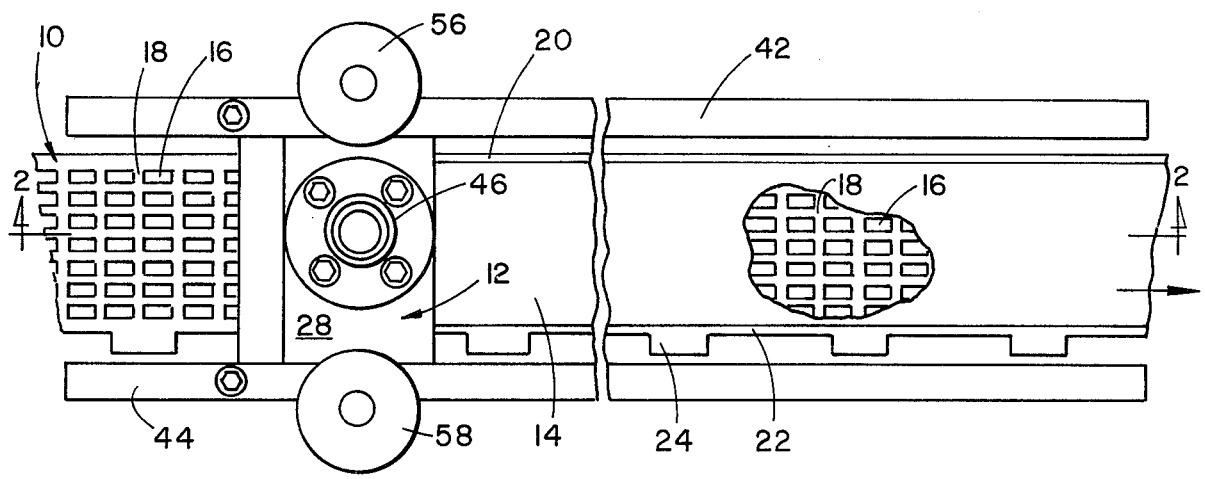
FIG. 1 is a top plan, partial cutaway view of battery pasting apparatus with the grid substrate shown prior to and after pasting.
Figure 2:
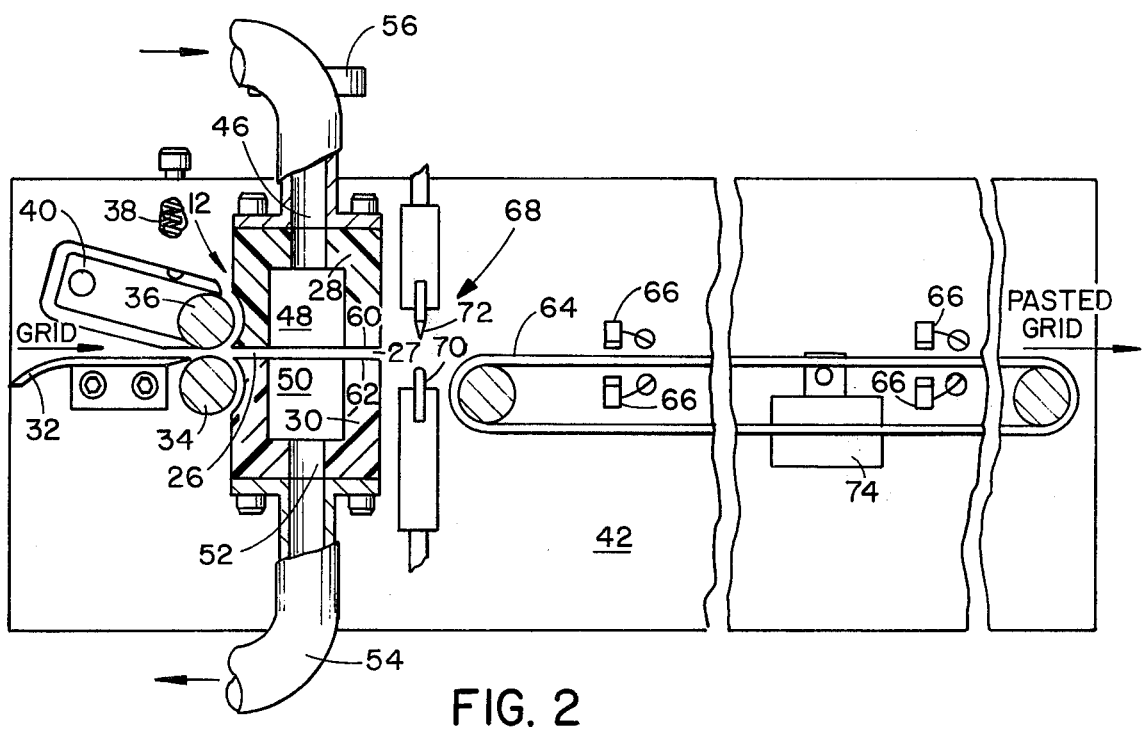
FIG. 2 is a partial sectional view along section 2—2 of FIG. 1, however, with the addition of a cutting mechanism and omission of the grid shown in FIG. 1.

Turning now to the embodiment of FIGS. 1 and 2, it is seen generally that grid 10 is advanced through a pasting nozzle 12 which applies a layer of paste 14 on both major (e.g., top and bottom) surfaces of the substrate and also fills the interstices 16 formed between the grid bars 18 of the perforated grid. In this embodiment the pasting nozzle is so chosen that the marginal portions of the grid substrate, including first side margin 20 and second side margin 22 together with spaced tabs 24, are free of paste. In general, any continuous intermediate or side portion of the grid may be left unpasted, as desired. Similarly, if desired one or both of the marginal edges 20, 22 may be covered with paste.

According to the invention, grid 10 is introduced into the nozzle 12 through a passageway 26 whose height is determined by the spacing between upper nozzle half 28 and lower nozzle half 30. The grid substrate is introduced along guide ramp 32 and into the nip of a pair of drive rollers 34, 36, the former being driven (not shown) and the latter being biased downwardly by spring 38 acting against pivotally mounted linkage 40. The elements of the pasting apparatus are directly or indirectly attached to side sub-frame supports 42 and 44 which may be self-supporting or attached to a main frame (not shown).

Simultaneously with the advancement of the grid through passageway 26 of the nozzle, paste is supplied to inlet 46, into cavity 48 of upper nozzle half 28, through the interstices 16 of the grid (disposed between the cavities) and into the bottom cavity 50 of nozzle half 30. The paste is supplied to the inlet at preferably a predetermined volumetric flow rate, and in this particular embodiment a portion of the paste not picked off by the advancing grid will be recirculated out the bottom of nozzle half 30 through exit port 52 and line 54.

The spacing between nozzle halves 28 and 30 may be adjusted by set screw knobs 56, 58 whereby the gap spacing of passageway 26 may be selectively determined, however, this dimension will always be greater than the thickness of the grid substrate received therein. As the grid passes through the passageway of the nozzle, in addition to receiving paste directly within its interstices by flow through from cavity 48 to 50, paste will build up at the outlet of the nozzle passageway within die opening 27 defined by juxtaposed elongated lands 60, 62. As the grid is pushed through the nozzle cavity with the aid of the drive rollers and encounters the paste, it tends to float in the die exit opening 27 between the lands 60 and 62 and is discharged from the nozzle with a more or less substantially uniform layer of paste on both of the substrate's major surfaces. The elongated lands 60 and 62 tend to screed the paste opposite the top and bottom surfaces of the substrate; the degree of uniformity of the outer deposited paste surfaces is determined by the width of the passageway gap and the flow rate of paste into the nozzle. When the passageway gap is widened, the paste tends to be deposited more discretely rather than smoothly and uniformly.

As the thus pasted plate is withdrawn from passageway 26 through exit 27 it is collected on conveyor belt 64 and is advanced along the belt a predetermined distance until limit switches 66 are encountered, and in conventional manner a signal operably actuates a cutoff system shown at 68, comprising for instance, reciprocally mounted, air cylinder actuated anvil 70 and cutoff knife 72. After a length of pasted grid is cut to desired length, the operation is repeated continually. As will be appreciated, the cutoff mechanism may be spaced farther away from the exit 27 of the nozzle, and a take-up loop may be provided intermediately as a take-up to prevent buckling upon cutoff.

The apparatus may also be employed to paste presized individual grids on an intermittent basis, and in this case no cutoff mechanism would be required.

If desired, load cell 74 may be operably connected to conveyor belt 64 to measure the weight of the individually sized grid as pasted, and a signal indicative thereof may be used in a feedback control system to control the amount of paste supplied to the grid within passageway 26. Thus, for instance, the signal from load cell 74 may be used to regulate the gap thickness of the passageway or the flow rate of the paste, for instance. Manual monitoring and control may alternatively be used as desired.

Figure 3:
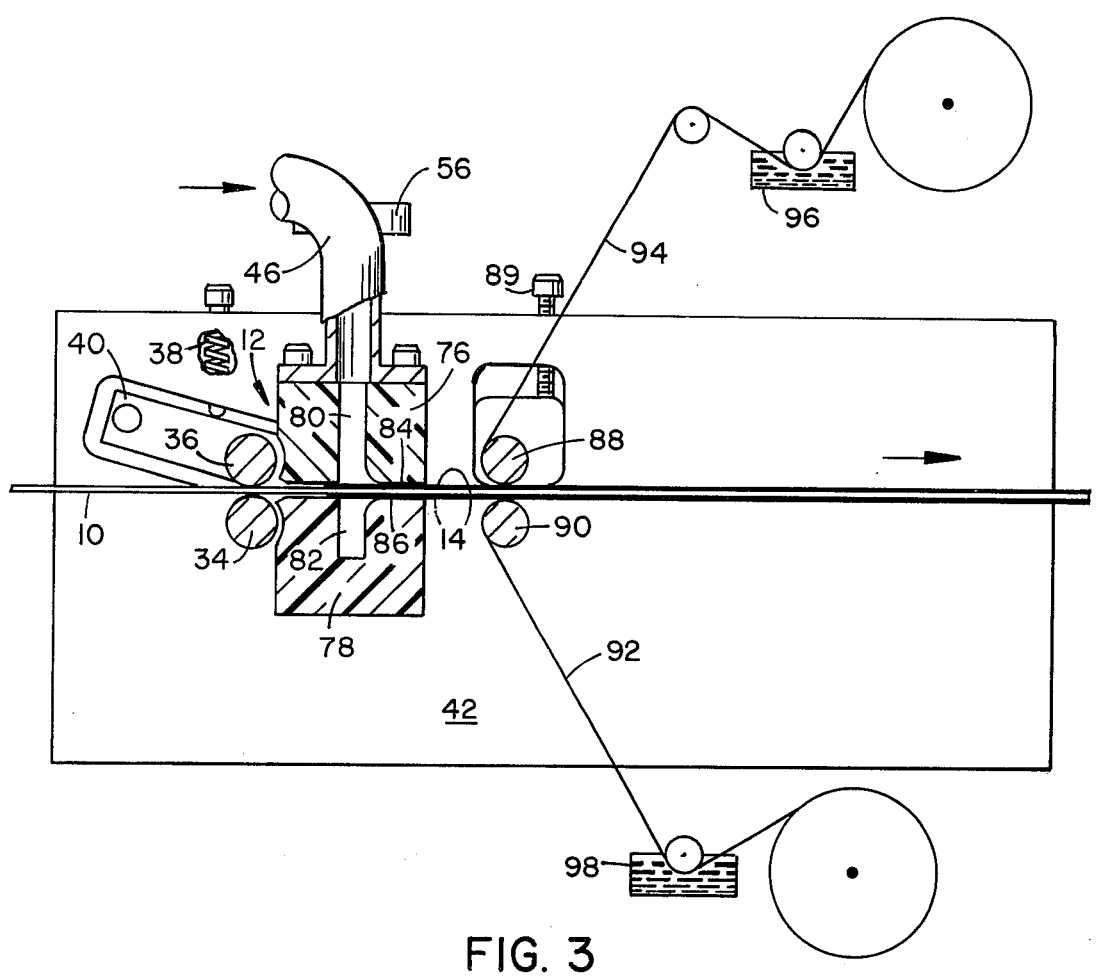
FIG. 3 depicts in a view similar to FIG. 2 an alternative pasting apparatus according to the invention.

The embodiment of FIG. 3 is similar to that of FIG. 2, however, with two important exceptions. First of all, the lower nozzle half 78 is provided with a blind cavity 82, with no outlet for recirculation of paste. While in the embodiment of FIGS. 1 and 2 the nozzle halves were spaced fairly closely together so that a uniform layer of paste 14 was deposited on the grid, and without the need for further processing other than cutting the plates to length. In the embodiment of FIG. 3 it is preferred to increase the spacing between the nozzle halves 76 and 78 for a given paste consistency. In this manner the paste which will be deposited onto and into the grid interstices and screeded by extended lands 84, 86, will possibly present a uniform outer surface of varying thickness and having peaks and valleys.

The second major difference in the embodiment of FIG. 3 is that there is provided downstream sizing rolls 88, 90 to smooth out and uniformly level the paste across the entire major surfaces of the grid, as well as uniformly fill out any unfilled interstices 16 of the grid. The spacing between the sizing rolls 88 and 90 is set to the desired thickness of the finished plate with the aid of set screw 89 and will generally be somewhat smaller than the passageway gap between die opening lands 84, 86. Although the sizing rolls may be so constructed as to not adhere and pick up paste deposition on the grid, such as by utilizing porous carbon rolls internally pressurized with water, it is presently preferred to use interposed pasting paper webs 92, 94 delivered around the sizing rollers and applied directly to the top and bottom major surfaces of the pasted grid. The paper is preferably rendered non-hygroscopic so that it can be easily stripped from the pasted grid subsequently without removal of paste therefrom, and this may be done by delivering the pasting paper through aqueous baths 96, 98.

The pasted grid with attached pasting paper of FIG. 3 may then be further processed, such as by length cutting, tab profiling, paper stripping, edge trimming, and wound with opposite polarity plates and separators.

With the paste having been metered accurately into the nozzle initially, no doctor blade or other wipe-off mechanism is needed, and in fact its omission provides a distinct advantage according to the invention. However, depending upon paste flow rate and paste viscosity, it may be desirable to somewhat overpaste the grid and thereafter trim the excess from one or both of the marginal edges.

Figure 6:
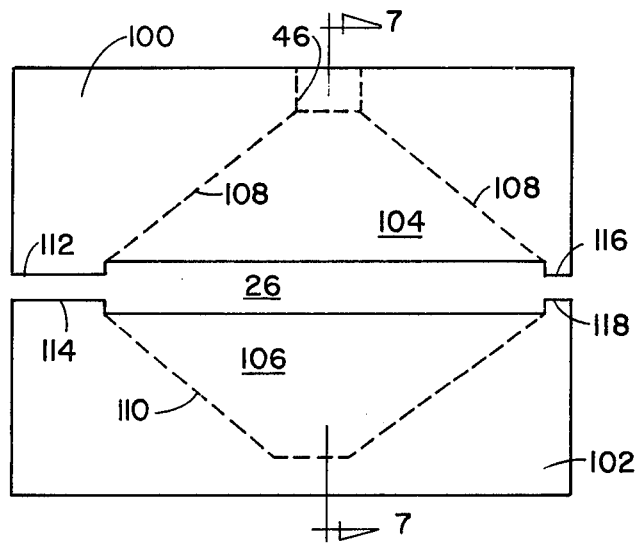
FIG. 6 is another alternative nozzle configuration, shown in end phantom view somewhat similar to the view shown in FIG. 5.
Figure 7:
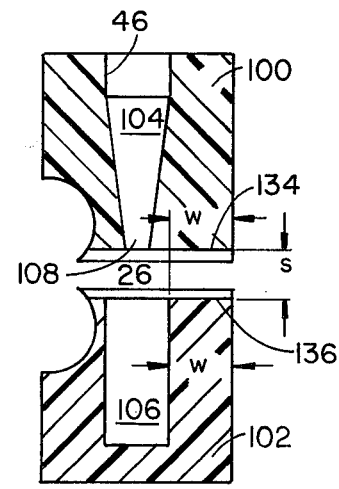
FIG. 7 is a sectional view along section 7—7 of FIG. 6.

A specific nozzle configuration which has been found to be especially suitable for the pasting of thixotropic leadbased pastes is shown in FIGS. 6 and 7. In that embodiment, the upper nozzle half 100 is provided with the usual paste inlet 46 with the cross section of the nozzle cavity 104, when viewed in the direction of travel of the substrate as shown in FIG. 6, being tapered outwardly or flared from the inlet 46 along surfaces 108.

The flared sides terminate at the passageway 26, with the length of the cavity opening adjoining the passageway being substantially greater than the transverse dimension of the inlet. When viewed transversely with respect to the direction of travel of the substrate as shown in FIG. 7, it is preferred that the cross section of the cavity of the upper nozzle taper from the inlet 46 to a lesser dimension at its outlet 108 intersecting passageway 26. In general, the ratio of the inlet-to-outlet cross-sectional area of the upper cavity is preferably from about 1:0.8 to about 1:3, and more preferably from about 1:1 to about 1:1.5. It has been found that for pasting narrow plates, e.g., less than about three inches in width, this ratio is not particularly critical, although for larger widths it is preferred to maintain nearly equal inlet and outlet cross-sectional areas.

The bottom nozzle half 102 is preferably also tapered at 110, although it has been found that this is not nearly so important as the corresponding flare in the upper nozzle half 100. However, it has been found that it is beneficial to employ steps 112, 114 and 116, 118 along those portions of the nozzle where it is desired not to apply paste to marginal edges of the grid, such as at marginal edges 20, 22 and tabs 24 shown in FIGS. 1 and 5. Thus, a larger spacing between the nozzle halves is provided along the intermediate facing portions of the nozzle halves opposite the cavities 104 and 106, and a lesser spacing is provided along the marginal edge facing portions opposite the steps.

Figure 9:
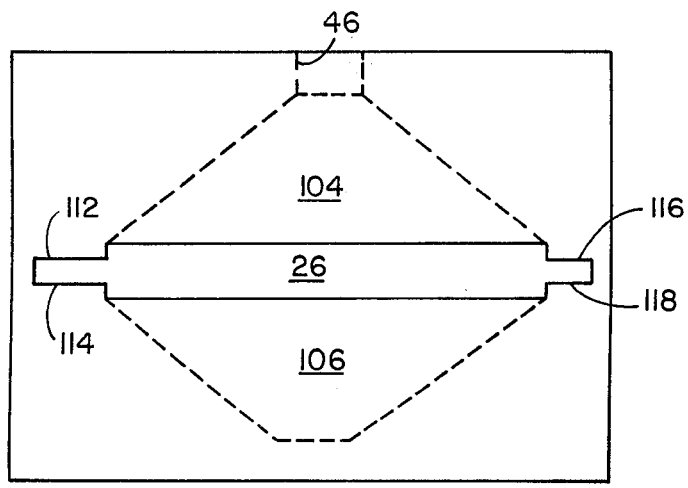
FIG. 9 depicts an end phantom view of still another nozzle configuration.

The nozzle embodiment shown in FIG. 9 is similar to that shown in FIGS. 6 and 7 with the exception that it is made of a single integral piece and therefore the passageway gap is not adjustable as in the previous embodiments.

Figure 5:
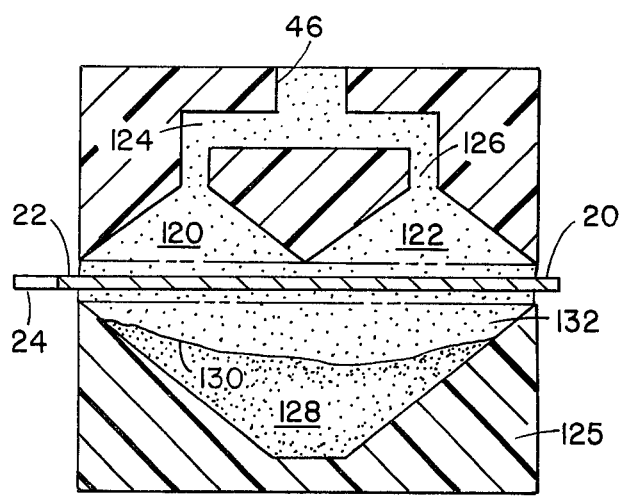
FIG. 5 is a view along section 5—5 of FIG. 4.

When it is desired to paste wider widths of grid substrates, such as greater than about three inches for lead-based plates, or when pasting from the bottom up (not shown), it has been found beneficial to provide cascaded cavities or a plurality of tapered upper nozzle cavities interconnected and in fluid communication jointly with the inlet. This is shown in FIG. 5 in which separate cavities 120, 122 are interconnected to the inlet 46 via passageways 124, 126, respectively. Using this design, pressure gradients across the outlet of cavities 120 and 122 are minimized.

Figure 4:
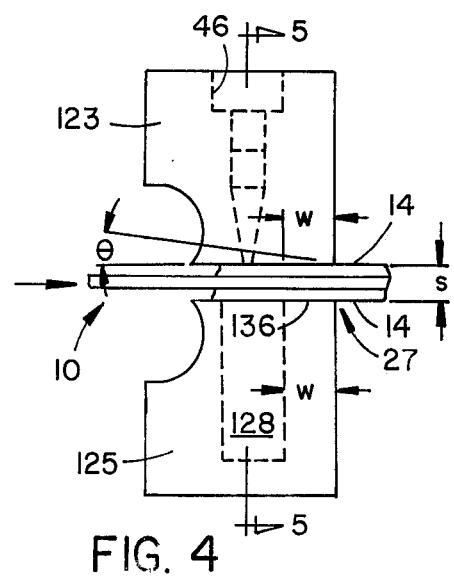
FIG. 4 depicts an alternative nozzle structure together with paste and grid, shown in side phantom view.

In the operation of the nozzle of FIGS. 4 and 5, and this will also apply to the other nozzles shown having a blind lower cavity, paste will be forced through the upper cavities 120, 122, through the interstices 16 of the perforated grid substrate, and into the lower cavity 128. After the paster has been in operation for some time and if thixotropic paste is employed, the paste in the bottom portion of cavity 28, below line 130 for example, may actually set up to some extent because of its thixotropic nature and form a more or less solid zone beneath surface 130. The paste in the upper portion 132 of the lower cavity will remain viscous and fluid by virtue of continued agitation and circulation, as it is picked off by the advancing substrate. It is critical to the invention that there be this underneath layer or zone in which paste is available to the underside of the passing grid substrate. It is also critical that the paste in zone 132 extend substantially below the lower die land surface 136.

While in general it is suitable for the upper and lower nozzle halves to have approximately parallel faces, pasting may be improved in particular cases by tilting one of the halves at an angle $\theta$ (theta) from the horizontal, as illustrated in FIG. 4. This angle is preferably up to about 5°, and more preferably less than about 3°. This tilt may improve grid entry to the nozzle and improved paste transfer.

Aslo according to preferred aspects of the invention, the exit outlet 27 of the nozzle resembles a die opening having lands (60, 62; 84, 86 and 134, 136) of dimension w in the direction of travel of the substrate which is substantially greater than the spacing or gap s between the upper and lower nozzle halves (28, 30; 76, 78 and 123, 125) at the exit outlet opening. More preferably, the dimension w is at least twice as great, and more preferably at least five times as great as the spacing or gap s between the nozzles. These elongated upper and lower facing lands in the nozzle outlet have been found to provide the necessary screeding action required to produce suitably pasted plates having more or less uniform major surfaces.

Figure 8:
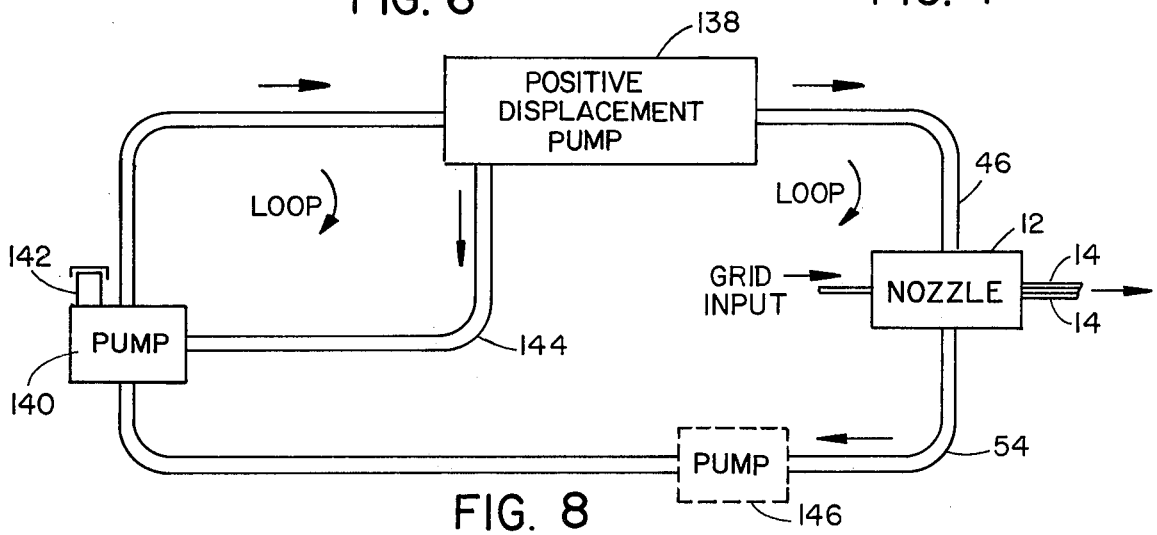
FIG. 8 is a schematic block diagram of an entire pasting system.

One preferred system employing recirculation is generally shown in FIG. 8. Paste is supplied to inlet 46 of nozzle 12 with the aid of a positive displacement pump 138, and this may be preferably of the progressing cavity type as disclosed in the aforementioned U.S. Pat. No. 3,814,628. As also disclosed in that patent, the thixotropic paste is handled initially by continually pumping and circulating it with a first pump means 140 through a substantially closed loop conduit system, with make-up paste being provided from time to time or continuously through hopper 142. A portion of the circulating paste pumped through the lines is diverted by the positive displacement pump 138, and the remaining, preferably major portion of the paste is returned through line 144 back to the primary pump. This method is more fully disclosed in the aforementioned U.S. Pat. No. 3,814,628, which is hereby incorporated by reference.

According to the recirculation embodiment of the invention as shown in FIG. 2, and in block diagram form in FIG. 8, a predetermined amount of excess paste pumped through nozzle 12 is returned to the first closed loop, preferably to pump 140, via return line 54. With thixotropic viscous paste, it may also be necessary to employ an additional pump 146 to provide necessary pumping action.

As previously described, it is possible to apply paste to the grid substrate in such a manner as to leave continuous longitudinal areas free of paste, such as along the border of the grip strip, or anywhere along its width. The only requirement for a paste-free area is that the envelope of the area desired to be left free of paste be outside the pasted area and its borders parallel to the direction of feed of the grid. These selected areas may be left paste free even though the nozzle halves are open along the passageway therebetween. This is permitted by balancing the speed at which the grid is advanced through the nozzle passageway with the amount of paste or its volumetric flow rate being fed into the nozzle. This balance is critical, although it may be easily adjusted by varying the flow rate of paste being pumped into the nozzle, by varying the grid feed speed, or by varying both.

It will be understood that the invention is capable of a variety of modifications and variations which will be made apparent to those skilled in the art upon a reading of the present specification. Such variations and modifications are intended to be encompassed within the scope of the appended claims. For instance, one such variation is that the paste can be delivered from underneath, via the lower nozzle half rather than through the upper nozzle half, as shown in the drawings. The upper nozzle half would then either be provided with an exit port for recirculation or have a blind cavity. Moreover, the geometric orientation of the nozzle halves is not narrowly critical, although it is preferred to feed the grid horizontally.

What is claimed is:

1. A method for applying an electrochemically active paste onto a grid substrate of determined thickness in the preparation of battery electrode plates, comprising:
   positioning first and second nozzle halves in juxtaposed relation and spaced apart a distance greater than the determined thickness of the substrate to define a passageway, each nozzle half having a cavity therein in at least partial alignment with the cavity associated with the other nozzle half, one of the cavities being provided with an inlet for reception of paste;
   advancing the grid substrate through the passageway;
   supplying paste to the inlet of the one cavity and forcing paste through interstices in the advancing grid substrate and into the other cavity; whereby said grid substrate floats in the paste present in said passageway substantially filling the intersticis of said grid substrate and forming uniform layers of paste on the surfaces of said grid substrate; and
   withdrawing the thus pasted grid substrate through the passageway.

2. The method of claim 1 wherein the paste is supplied to the cavity inlet at a substantially predetermined volumetric flow rate.

3. The method of claim 1 wherein the pasted grid substrate is withdrawn through a die opening in the nozzle passageway, said die opening being defined by juxtaposed lands formed in each of the nozzle halves which remain relatively stationary and which screed the paste on both sides of the substrate.

4. The method of claim 1 wherein the grid substrate is advanced through the passageway by drive means situated at the input side of the juxtaposed nozzle halves so that the drive means pushes the grid substrate through the passageway whereby the substrate floats in the paste present between the nozzle halves.

5. The method of claim 4 wherein the drive means pushing the grid substrate through the passageway is the sole means for advancing the grid substrate through the nozzle halves.

6. The method of claim 1 wherein the electrochemically active paste is a viscous, thixotropic lead-based paste.

7. The method of claim 6 wherein the other cavity if provided with an exit port for eventual recirculation os paste back to said inlet.

8. The method of claim 1 wherein continuous strips of grid substrate are advanced through the nozzle halves and pasted in a continuous fashion.

9. The method of claim 8 wherein the grid substrate has discrete, spaced tabs positioned along a marginal edge thereof, and wherein such marginal tabs are positioned laterally with respect to the cavities of each of the nozzle halves and are substantially free of paste when exiting the passageway.

10. The method of claim 1 wherein the grid substrate is pasted to carry a layer of paste on each major surface of the grid substrate which completely covers the substrate.

11. The method of claim 1 wherein the thus pasted grid substrate which is withdrawn through the passageway is advanced through a pair of juxtaposed sizing rolls which smooth out the paste supplied to the grid substrate from the nozzle halves.

12. A method for pasting foraminous battery plate substrates with viscous thixotropic electrochemically active paste comprising:
   providing a pasting nozzle having a through passageway defined by an upper cavity provided with an inlet for reception of paste, and a juxtaposed lower cavity spaced from the upper cavity a distance greater than the thickness of the foraminous substrate, and stationary relative to the upper cavity, the lower cavity being closed at its bottom portion to preclude paste recirculation therethrough;
   advancing the foraminous substrate through the passageway while simultaneously supplying paste to the inlet of the upper cavity, forcing paste through the foraminous substrate and into the lower cavity, thereby impregnating the foraminous substrate with paste;
   further advancing the foraminous substrate through a die opening having juxtaposed spaced lands whose length in the direction of travel of the substrate exceed the spacing between the lands; whereby said substrate floats in the paste present in said passageway substantially filling the intersticis of said grid and forming uniform layers of paste on the surfaces of said grid; and
   withdrawing the thus pasted substrate.

13. A method for pasting foraminous battery substrates comprising the steps of:
   continually pumping and circulating a viscous thixotropic battery paste with first pump means through a substantially closed loop conduit system, equipped with an inlet for make-up paste;
   diverting the flow of a portion of the circulating paste away from the closed loop and metering the diverted paste at a substantially predetermined volumetric flow rate to a pasting nozzle comprised of a pair of spaced apart juxtaposed nozzle cavities, the spacing defining a substrate passageway;
   advancing the foraminous substrate through the passageway while simultaneously flowing plate (1) through one of the cavities, (2) through interstices in the substrate and (3) into the other nozzle cavity; and
   recirculating paste from an outlet of the other nozzle cavity back to the closed loop.

14. The method of claim 13 wherein the paste exiting the other nozzle cavity is recirculated to the first pump means.

15. The method of claim 14 wherein the paste from the other nozzle cavity is recirculated to the first pump means with the aid of a third pump means contained within the recirculating conduit.

16. Apparatus for pasting foraminous battery substrates having major top and bottom surfaces with viscous battery paste comprising:
   a first nozzle half having a through cavity and an inlet for reception of paste;
   a second nozzle half having a constant volume cavity disposed oppositely to the cavity of the first nozzle half;
   the first and second nozzle halves, in operation, being stationary relative to one another and being spaced apart greater than the substrate thickness to define a through passageway providing an inlet and outlet for the substrate;

means for supplying paste to the inlet and cavity of the first nozzle half, for forcing it through interstices in the foraminous substrate, and for supplying the paste to the cavity of the second nozzle half;

means for advancing the substrate through the passageway; whereby said substrate floats in the paste present in said passageway substantially filling the intersticis of said grid and forming uniform layers of paste on the surfaces of said grid; and means positioned substantially at the outlet of the passageway for screeding the paste opposite the top and bottom surfaces of the substrate without contacting the substrate.

17. The apparatus of claim 16 wherein the screeding means includes elongated lands positioned at the passageway outlet which individually have a length, when measured in the direction of intended travel of the substrate, which is greater than the spacing separating the first and second nozzle halves.

18. The apparatus of claim 16 wherein the first and second nozzle halves are interconnected to form a single nozzle unit.

19. The apparatus of claim 16 wherein the first and second nozzle halves are formed separately, and further including means for selectively adjusting the spacing between the first and second nozzle halves.

20. The apparatus of claim 19 wherein the first and second nozzle halves are tilted relative to one another up to a tilting angle of about 5°, thereby forming the passageway with a greater dimension at its inlet than at its outlet.

21. The apparatus of claim 16 wherein the cavity of the second nozzle half is a blind cavity, being closed other than being in open fluid communication with the passageway.

22. The apparatus of claim 16 further including means positioned downstream of the screeding means for smoothing the paste generally parallel to the major top and bottom surfaces of the substrate.

23. The apparatus of claim 16 further including means for cutting battery plates to size from pasted substrates exiting from the apparatus.

24. The apparatus of claim 23 wherein there is further included, positioned downstream of the cutting means, means for measuring the weight of the battery plate which has been cut to size, and means responsive to the measured weight for controlling the amount of paste supplied to the substrate.

25. The apparatus of claim 16 wherein said advancing means includes a pair of juxtaposed drive rollers positioned adjacent the inlet side of the passageway for pushing the substrate through the passageway.

26. The apparatus of claim 16 wherein the cavity of the first nozzle half has a cross section viewed in the direction of travel of the substrate which tapers outwardly from the inlet to a greater dimension at the passageway.

27. The apparatus of claim 26 wherein the cross section of the cavity of the first nozzle, when viewed transversely with respect to the direction of travel of the substrate, is tapered from the inlet inwardly to a lesser dimension at the passageway.

28. The apparatus of claim 26 including a plurality of such tapered nozzle cavities interconnected and in fluid communication jointly with the inlet.

29. The apparatus of claim 16 wherein the cavity of the first nozzle half has an internal surface which tapers from its paste reception inlet to an outlet adjacent the passageway, the ratio of the cross-sectional area of the paste reception inlet to such outlet adjacent the passageway, as measured in a plane parallel to the direction of travel of the substrate, being in the range from about 1:1 to about 1:3.

30. The apparatus of claim 16 wherein the passageway between the first and second nozzle halves is laterally stepped and defined by a first spacing along intermediate facing portions of the nozzle halves, and a second spacing along at least one marginal edge portion of the facing nozzle halves which is less in dimension than the first spacing.

31. Apparatus for pasting foraminous battery substrates having major top and bottom surfaces with viscous battery paste comprising:

a first nozzle half having a through cavity with an inlet for reception of paste;

a second nozzle half having a through cavity disposed oppositely to the cavity of the first nozzle half, the cavity of the second nozzle half being open completely through the nozzle half thereby providing an exit port for circulating paste through the second nozzle half;

the first and second nozzle halves being spaced apart greater than the substrate thickness to define a through passageway providing an inlet and outlet for the substrate;

means for supplying paste to the inlet of the cavity of the first nozzle half, for forcing it through the interstices in the foraminous substrate, and for supplying the paste to the cavity of the second nozzle half and circulating it therethrough;

means for advancing the substrate through the passageway; and means positioned substantially at the outlet of the passageway for screeding the paste opposite the top and bottom surfaces of the substrate.

32. A method for pasting battery grid of soft deformable lead of Brinell Hardness (10mm/31.2kg–120sec.) less than about 10kg/mm$^2$ having through interstices, major surfaces, and a given thickness, with thixotropic battery paste, comprising:

introducing the soft grid into a through passageway having an inlet and outlet defined between spaced stationary nozzle halves each having cavities indented therein;

said nozzle halves being spaced apart substantially greater than the grid thickness;

injecting paste at a substantially predetermined flow rate into one nozzle half cavity, through the interstices of the grid and into the other nozzle half cavity and substantially filling the same; and continuing to introduce the grid into the passageway between the paste filled cavities so that the grid floats through the outlet and paste is screeded into the interstices and onto the major surfaces of the grid in substantially uniform amount on each such major surface to form paste layers on each of such major surfaces of the grid.

33. The method of claim 32 wherein the outlet of the passageway is defined by juxtaposed elongated lands which screed the paste onto both major surfaces of the grid.

34. The method of claim 33 wherein there is included the additional step of:

passing the thus pasted grid through sizing rolls spaced apart a lesser distance than the corresponding dimension of the passageway outlet, said outlet being determined by the spacing between the juxtaposed elongated lands.

35. The method of claim 33 wherein the first nozzle half and its cavity is positioned vertically above the other nozzle half and its cavity, and whereby the paste in the other (lower) nozzle half cavity is maintained below the height of the elongated land associated with the lower nozzle half.

* * * * *

UNITED STATES PATENT OFFICE
CERTIFICATE OF CORRECTION

PATENT NO. : 4,050,482
DATED : September 27, 1977
INVENTOR(S) : Larry K. W. Ching, Charles E. Coleman, Toshio Uba It is certified that error appears in the above-identified patent and that said Letters Patent are hereby corrected as shown below:

Column 1, line 7, second word should be "substrates" -- .

Column 1, line 16, first word should be "scrape" -- .

Column 2, line 47, first word should be "grid" -- .

Column 7, line 25, fifth word should be "interstices" -- .

Column 7, line 52, last word should be "is" -- .

Column 7, line 53, last word should be "of" -- .

Column 8, line 28, fifth word should be "interstices" -- .

Column 8, line 45, fifth word should be "paste" -- .

Column 9, line 10, first word should be "interstices" -- .

Signed and Sealed this

Twenty-first Day of February 1978

[SEAL]

Attest:

RUTH C. MASON
Attesting Officer

LUTRELLE F. PARKER
Acting Commissioner of Patents and Trademarks